(No Model.)  2 Sheets—Sheet 1.

J. J. DUARTE.
STEERING APPARATUS FOR VESSELS.

No. 396,736.  Patented Jan. 29, 1889.

Witnesses:
Robt. W. Matthews
Geo. C. Ward

Inventor:
Joaquin J. Duarte
per C. D. Shaw & Co.
attys.

(No Model.) 2 Sheets—Sheet 2.

J. J. DUARTE.
STEERING APPARATUS FOR VESSELS.

No. 396,736. Patented Jan. 29, 1889.

Witnesses:
Robt W. Matthews
Geo. C. Ward

Inventor:
Joaquim J. Duarte
per C. A. Shaw & Co.
att'ys.

UNITED STATES PATENT OFFICE.

JOAQUIM J. DUARTE, OF BOSTON, MASSACHUSETTS.

STEERING APPARATUS FOR VESSELS.

SPECIFICATION forming part of Letters Patent No. 396,736, dated January 29, 1889.

Application filed August 15, 1887. Serial No. 247,006. (No model.)

*To all whom it may concern:*

Be it known that I, JOAQUIM J. DUARTE, of Boston, in the county of Suffolk, State of Massachusetts, have invented a certain new and useful Improvement in Steering Apparatus for Vessels, of which the following is a description sufficiently full, clear, and exact to enable any person skilled in the art or science to which said invention appertains to make and use the same, reference being had to the accompanying drawings, forming part of this specification, in which—

Figure 1:
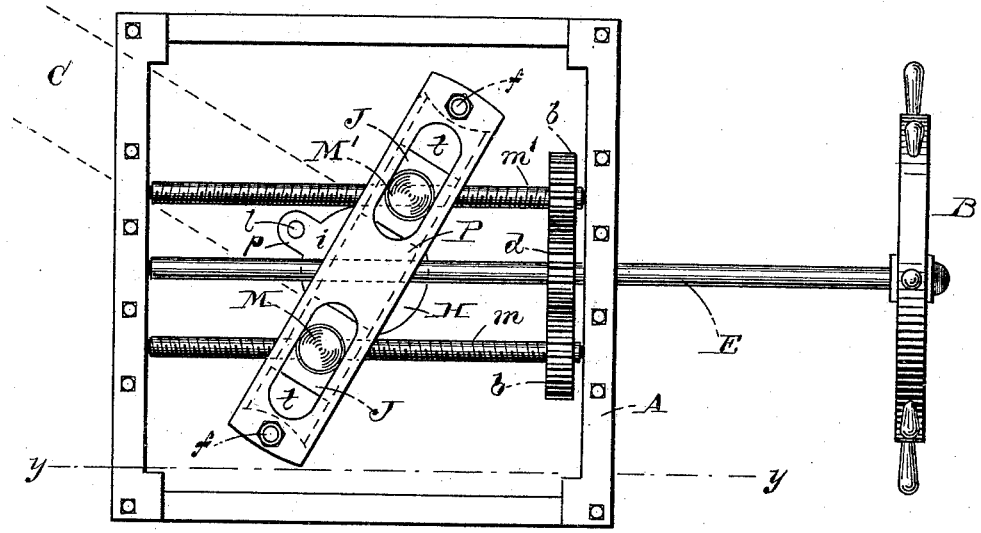
Figures 2, 3:
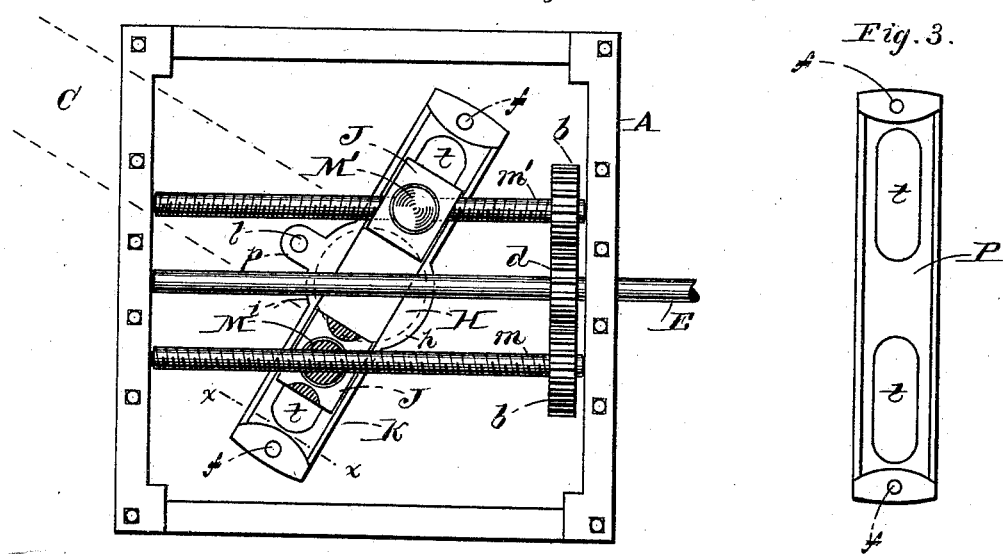
Figure 4:
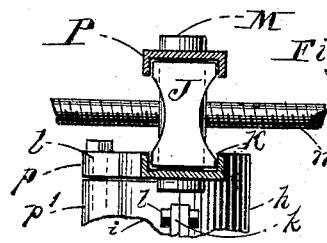
Figure 5:
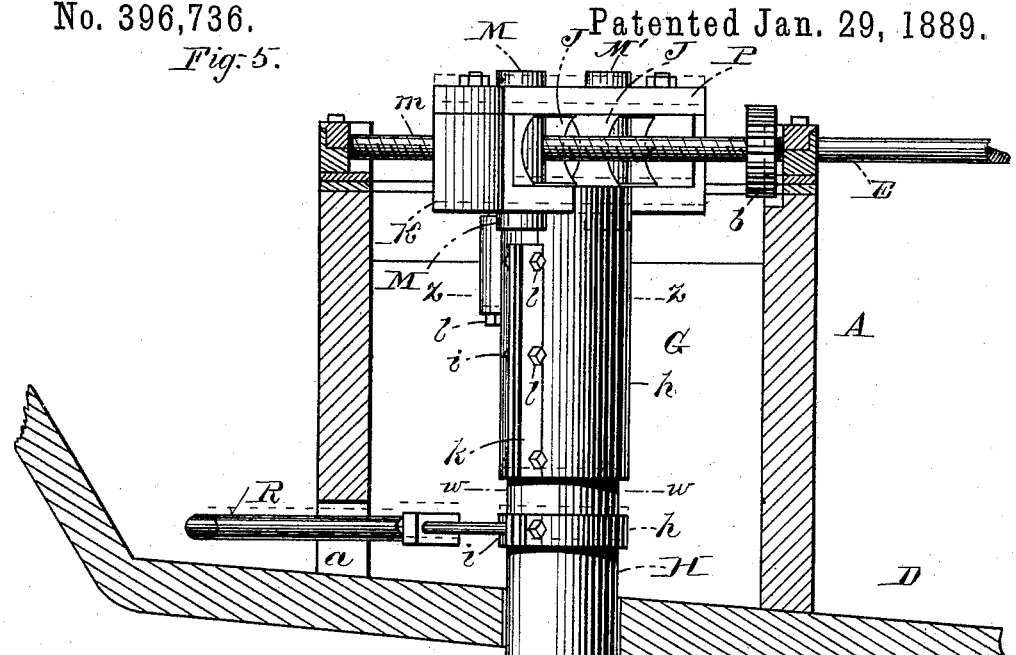
Figure 8:
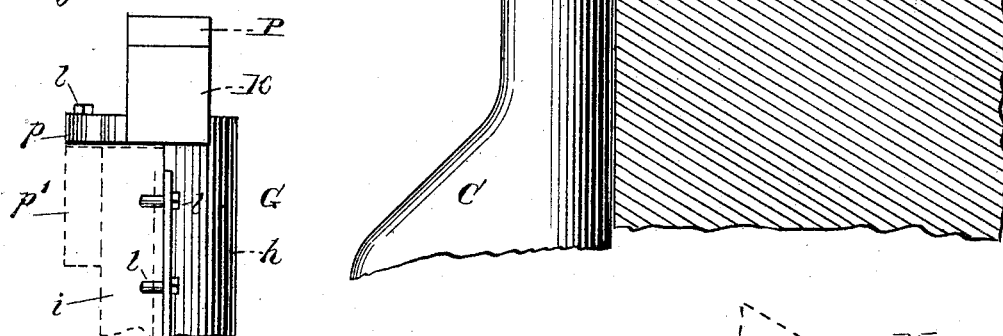
Figure 6:
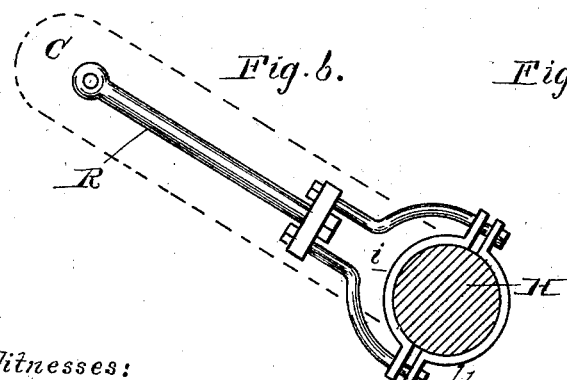
Figure 7:
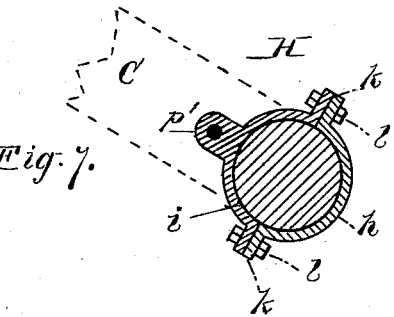

Figure 1 is a top plan view of my improved steering apparatus; Fig. 2, a like view, the top of the slide being removed and one of the boxes shown in horizontal section; Fig. 3, a bottom plan view of the top of the slide; Fig. 4, a vertical transverse section taken on line $x\,x$ in Fig. 2, the rudder-head and screws being represented as broken off; Fig. 5, a vertical transverse section taken on line $y\,y$ in Fig. 1, the working parts being shown in perspective and side elevation and the rudder and shaft represented as broken off; Fig. 6, a horizontal section of the rudder-head taken on line $w\,w$ in Fig. 5; Fig. 7, a like view taken on line $z\,z$ in Fig. 5, and Fig. 8 a view of the clamping-straps detached.

Like letters of reference indicate corresponding parts in the different figures of the drawings.

My invention relates more especially to that class of steering apparatus which is attached directly to the rudder-head of the vessel without the intervention of steering-chains and operated by the ordinary steering-wheel; and it consists in a novel combination and arrangement of parts, as hereinafter more fully set forth and claimed, the object being to produce a simpler and more effective device of this character than is now in ordinary use.

The nature and operation of the improvement will be readily understood by all conversant with such matters from the following explanation.

In the drawings, A represents the supporting-frame of the apparatus; B, the steering-wheel, and C the rudder. The frame A is secured to the deck D of the vessel around the rudder-head H. The wheel B is disposed on one end of a horizontally-arranged shaft, E, journaled centrally in the top of said frame. A horizontally-arranged right-hand screw-shaft, $m$, and left-hand screw-shaft, $m'$, are journaled in the frame A on either side of the shaft E, respectively, said screw-shafts being each provided at their forward ends with a gear, $b$, which intermeshes with a gear, $d$, on said shaft. A clamp, G, (see Fig. 8,) is secured around the upper end of the rudder-head H, said clamp consisting of the two straps $h\,i$. The strap $h$ extends over the top of the rudder-head H, and is provided on its upper portion with a horizontally-arranged cross-head, K, (see Fig. 4,) preferably cast integral therewith. The strap H is also provided with vertical flanges $k$ and a lip, $p$, (see Figs. 4 and 8,) and the strap $i$ with a corresponding lip, $p'$, and flanges $k$, said straps being secured together around the rudder-head by bolts in such a manner as not to revolve thereon.

Disposed in the cross-head K, on either side of the shaft E, are rectangular boxes J, said boxes being respectively journaled on vertically-arranged shafts M M', which are provided with horizontally-arranged screw-threaded holes, and form nuts which travel on the screw-shafts $m\,m'$, said screw-shafts passing centrally through said vertical shafts.

The cross-head K comprises a top plate or cover, P, (see Fig. 3,) secured to bottom plate by bolts $f$, said bottom and top comprising a skeleton cross-head open at its sides and having longitudinal slots $t$, through which the ends of the vertical shafts M M' protrude, as shown in Fig. 4. This skeleton cross-head is provided with interior guideways in which the boxes or blocks J slide.

Below the clamp G, on the rudder-head H, is strapped an ordinary tiller, R, projecting backwardly through an opening, $a$, in the frame A, the purpose of said tiller being to enable the helmsman to manage the rudder C by means of the wheel B and the ordinary steering chains and blocks, (not shown,) should the apparatus described become accidentally disarranged. I do not, however, confine myself to the use of the tiller R, as it may be omitted, if desired.

In the use of my invention the helmsman by turning the wheel B sets in motion the screw-shafts $m\,m'$, causing the vertical shafts M M' to travel forward or back on said screw-shafts, as the case may be. The boxes J J at the same time slightly revolve in the shafts M M', as said shafts travel on the screw-shafts m m', thereby permitting said boxes to move back and forth in the ways of the cross-head K, said cross-head being swung reciprocally in a horizontal plane as the boxes move back and forth, thereby turning the rudder C in the direction desired.

It will readily be seen that by disposing the apparatus, as described, directly over the rudder-head H, and by the use of the gears $b$ $d$ and the screw-shafts $m\ m'$, the helmsman will have much better control of the rudder than when the ordinary steering wheel and chains are used. As the blocks J slide within the cross-head itself and the screw-shafts pass directly through the vertical shafts pivoted in said box, the power is exerted directly upon the cross-head, and there is little friction and no cramping of the parts. The helmsman is also relieved from the constant jar and sudden shocks caused by the "slatting" of the rudder in rough weather, as a very little force exerted on the wheel will prevent the rudder from causing the screw-shafts $m\ m'$ to rotate.

By providing the openings $t$ in the slide K and extending the shafts M M' through them allowance is made for the vertical motion or play of the rudder, said slide occupying the position shown by dotted lines in Fig. 5 when the rudder rises.

It will be understood that should one of the screws $m\ m'$ become accidentally inoperative the rudder can still be actuated by the remaining screw, and that should both become disabled the tiller R may be connected to the shaft E, as described, and the rudder operated thereby.

Having thus explained my invention, what I claim is—

In a steering apparatus, the combination of a frame, a central shaft journaled in said frame and provided with a steering-wheel at one end, a screw-shaft at one side of the central shaft provided with a right-hand screw-thread, a screw-shaft at the other side of the central shaft provided with a left-hand screw-thread, intermeshing gears on said shafts, a rudder-head at right angles to said shafts, an oscillating cross-head attached to said rudder-head, said cross-head being open at its sides and provided with interior guideways and with slots in its top and bottom plates on opposite sides of the rudder-head, sliding blocks movable in said guideways within said cross-head, and short vertical shafts turning in said blocks and movable in said slots of the cross-head, said cross-head and blocks having vertical play on the vertical shafts, and the vertical shafts being provided with horizontal screw-threaded holes, and said screw-shafts passing through said holes of the vertical shafts and through the open cross-head, substantially as described.

JOAQUIM J. $\overset{\text{his}}{\times}$ DUARTE.
mark

Witnesses:
ROBT. ARMSTRONG,
E. L. SAWYER.